United States Patent
Ahearn et al.

(10) Patent No.: US 9,514,585 B2
(45) Date of Patent: Dec. 6, 2016

(54) WIRELESS ELECTRONIC LOCK SYSTEM AND METHOD

(71) Applicant: Schlage Lock Company LLC, Indianapolis, IN (US)

(72) Inventors: John Robert Ahearn, Pasadena, CA (US); Joseph Wayne Baumgarte, Carmel, IN (US); Gabriel Daniel Focke, Sunman, IN (US); Michael Scott Henney, Indianapolis, IN (US)

(73) Assignee: Schlage Lock Company LLC, Indianapolis, IN (US)

( * ) Notice: Subject to any disclaimer, the term of this patent is extended or adjusted under 35 U.S.C. 154(b) by 90 days.

(21) Appl. No.: 13/969,387

(22) Filed: Aug. 16, 2013

(65) Prior Publication Data

US 2014/0051355 A1 Feb. 20, 2014

Related U.S. Application Data

(60) Provisional application No. 61/684,086, filed on Aug. 16, 2012.

(51) Int. Cl.
*H04B 5/00* (2006.01)
*G07C 9/00* (2006.01)

(52) U.S. Cl.
CPC ......... *G07C 9/00174* (2013.01); *H04B 5/0006* (2013.01); *H04B 5/0031* (2013.01)

(58) Field of Classification Search
CPC .................................. G07C 9/00174
USPC ................ 455/41.1, 41.2, 41.3; 340/5.61
See application file for complete search history.

(56) References Cited

U.S. PATENT DOCUMENTS

| | | | |
|---|---|---|---|
| 6,324,261 B1 * | 11/2001 | Merte | H04M 1/0291 |
| | | | 379/102.06 |
| 2003/0160681 A1 | 8/2003 | Menard et al. | |
| 2006/0170533 A1 | 8/2006 | Chioiu et al. | |
| 2008/0129498 A1 | 6/2008 | Howarter et al. | |
| 2009/0320538 A1 | 12/2009 | Pellaton | |
| 2010/0176919 A1 | 7/2010 | Myers et al. | |
| 2010/0283579 A1 | 11/2010 | Kraus et al. | |
| 2012/0068817 A1 | 3/2012 | Fisher | |
| 2012/0280790 A1 | 11/2012 | Gerhardt et al. | |
| 2014/0049368 A1 | 2/2014 | Ahearn et al. | |

FOREIGN PATENT DOCUMENTS

| | | |
|---|---|---|
| GB | 2417858 A | 3/2006 |
| WO | 2009064689 A1 | 5/2009 |
| WO | 2011091038 A2 | 7/2011 |

OTHER PUBLICATIONS

International Search Report for PCT/US13/55448 dated Nov. 13, 2013, 2 pages.
Written Opinion of the International Searching Authority for PCT/US13/55448 dated Nov. 13, 2013, 4 pages.
European Search Report; European Patent Office; European Patent Application No. 13829809.6; Feb. 26, 2016; 8 pages.

\* cited by examiner

*Primary Examiner* — Hsin-Chun Liao
(74) *Attorney, Agent, or Firm* — Taft Stettinius & Hollister LLP

(57) ABSTRACT

A electronic lock system and method including an electronic lock, a mobile device and/or a wireless device. The electronic lock is capable of sending a message to the mobile device via wireless communication and/or to the wireless device based on a triggering event. The mobile device and/or the wireless device may in turn perform an action based on the received message. In one embodiment, the electronic lock, the mobile device the wireless device communicate with one another wirelessly via Bluetooth communication.

18 Claims, 3 Drawing Sheets

WIRELESS ELECTRONIC LOCK SYSTEM AND METHOD

CROSS-REFERENCE TO RELATED APPLICATIONS

The present application claims the benefit of U.S. Provisional Patent Application No. 61/684,086 filed on Aug. 16, 2012, the contents of which are incorporated herein by reference in their entirety.

BACKGROUND

Electronic lock systems may be employed for operating electronic locks. Existing electronic lock systems have various shortcomings relative to certain applications. For example, existing lock systems include electronic locks that are only able to communicate with standard electronic devices for which the lock system was specifically designed. Integrating custom or non-standard electronic devices into the lock system may be difficult if not impossible to achieve. Accordingly, there remains a need for further contributions in this area of technology.

SUMMARY

One embodiment of the present invention includes a unique system and method for communicating with and/or operating an electronic lock. Other embodiments include apparatuses, systems, devices, hardware, methods, and combinations for the same. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DETAILED DESCRIPTION

Figure 1:
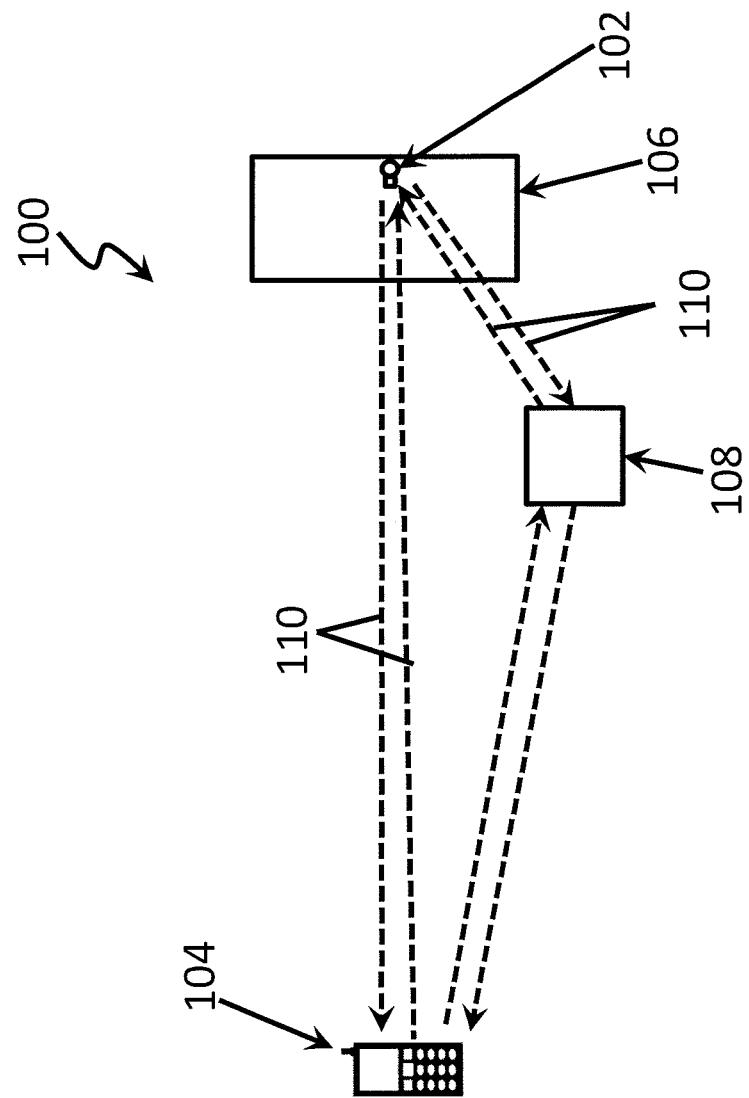
FIG. 1 is schematic diagram of an electronic lock system according to one form of the present invention.

For the purposes of promoting an understanding of the principles of the invention, reference will now be made to the embodiments illustrated in the drawings and specific language will be used to describe the same. It will nevertheless be understood that no limitation on the scope of the invention is hereby intended. Any alterations and further modifications in the described embodiments, and any further applications of the principles of the invention as described herein are contemplated as would normally occur to one skilled in the art to which the invention relates.

Referring to FIG. 1, illustrated therein is an electronic lock system 100 according to one form of the present invention. The electronic lock system 100 generally includes an electronic lock 102 and a mobile device 104. The electronic lock 102 is operatively attached to a door 106 or another type of access restriction structure, the details of which are known to those having ordinary skill in the art. The mobile device 104 may be a mobile phone (e.g., a smartphone), a tablet, a portable computer, and/or any other mobile computing or communication device. The electronic lock system 100 may include one or more other wireless devices 108 such as, for example, a wireless doorbell or input signal device, a wireless door chime or annunciator device, a desktop computer, a laptop computer, a network bridge, a router, a server and/or database, or any other computing or communication device suitable for use in association with the electronic lock system 100. The electronic lock system 100 may include one or more electronic locks 102, one or more mobile devices 104, and/or one or more wireless devices 108. A plurality of the mobile devices 104 may be provided that are each configured to communicate with one or more of the electronic locks 102.

The electronic lock system 100 may be used in association with an external or internal door 106 on a building such as, for example, a residential home. However, it is also contemplated that the electronic lock system 100 may be used in association with a window or other types of access restriction structures, and in association with apartment buildings, commercial buildings, storage units, and/or any other structure or building that utilizes one or more of the electronic locks 102 to restrict access to one or more access-controlled areas.

The electronic lock 102 may be configured to detect certain events and/or to perform an action or function based upon a detected event such as, for example, sending a message or data to the mobile device 104 and/or the wireless device 108 in response to an event. The electronic lock 102 and the mobile device 104 communicate with one another wirelessly, preferably via Bluetooth communication such as, for example, Bluetooth Low Energy ("BLE") communication. As used herein, the term Bluetooth may also refer to BLE. Similarly, the electronic lock 102 and the wireless device 108 communicate with one another wirelessly, preferably via Bluetooth communication, and more preferably via BLE communication. Additionally, the mobile device 104 and the wireless device 108 may communicate with one another wirelessly, preferably via Bluetooth communication, such as, for example, Bluetooth Low Energy ("BLE") communication. However, it is contemplated that a wireless communication protocol other than Bluetooth or BLE communication may be used in association with the electronic lock system 100 to provide a wireless communication link between the electronic lock 102, the mobile device 104, and the wireless device 108.

In one embodiment, the electronic lock 102 may be provided with wireless alarm capabilities via Bluetooth or BLE communication. In another embodiment, once the electronic lock 102 is installed, an appropriate program or application may be installed on the mobile device 104 (e.g., a smartphone) for use in association with the electronic lock 102 and/or the wireless device 108. It is also contemplated that the manufacturer of the electronic lock 102 does not necessarily have to supply or specify a particular mobile device 104 and/or a particular wireless device 108. Instead, various types of mobile devices 104 and/or wireless devices 108 could be provided by an end user or a third party for integration into the electronic lock system 100 and for communication with the electronic lock 102.

In a further embodiment, a customizable Bluetooth or BLE message, information or data 110 could be sent from the electronic lock 102 to the mobile device 104 and/or the wireless device 108, and from the mobile device 104 and/or the wireless device 108 to the electronic lock 102. In other embodiments, customizable Bluetooth or BLE signals or data could also be sent between the mobile device 104 and the wireless device 108. In one particular embodiment, the electronic lock 102 could send a Bluetooth or BLE message 110 to the mobile device 102 in response to a trigger event such as, for example, the opening or closing of the door 106, movement of the door handle or deadbolt on either side of the door 106, tampering with the electronic lock 102, and/or a shock event such as, for example, a door kick-in. The Bluetooth or BLE message 110 may indicate to the user of the mobile device 104 the type of event that has occurred, the time of the event, and/or an inquiry as to whether the user would like to take some type of action in response to the event.

The electronic lock 102 may also be configured to communicate with a wireless device 108 such as, for example, a computer, which in turn may be configured to trigger alarms, send text messages or other communications, place emergency phone calls, and/or perform other appropriate actions or functions. The wireless device 108 and/or the electronic lock 102 may also be configured to communicate with a "Nexia-like" back end computing/communication device. For example, the electronic lock 102 may communicate with a wireless device 108, such as a computer having Bluetooth or BLE capabilities, via Bluetooth or BLE communication in response to a trigger event. The wireless device 108 (e.g., a computer) may receive a Bluetooth or BLE message 110 from the electronic lock 102 indicating that the computer should communicate with a server on the Internet to trigger an alarm, send a text message or other communication, place an emergency phone call, and/or perform any other appropriate action or function.

In one specific embodiment, the wireless device 108 could be configured as a wireless input device such as, for example, a wireless doorbell input or button that communicates with the electronic lock 102 when pressed, and which may trigger the electronic lock 102 to send an appropriate Bluetooth or BLE message 110 to the mobile device 104. It is contemplated that the wireless doorbell button may be located in proximity to the door 106, at a location remote from the door 106, or may be incorporated into the electronic lock 102. The electronic lock 102 may also be configured to trigger or activate another wireless Bluetooth or BLE device 108 such as, for example, a wireless indicator or annunciator such as a wireless door chime that could be triggered or activated by the electronic lock 102 via a Bluetooth or BLE message 110 when a button or input device near the door 106 or incorporated into the electronic lock 102 is pressed. It is further contemplated that the electronic lock 102 may send a Bluetooth or BLE message 110 to the wireless door chime or another type of indicator or annunciator in response to a different triggering event.

In some embodiments, the mobile device 104 may include a microphone that can be used to create audio memos or files that could then be sent to the electronic lock 102 via a Bluetooth or BLE message 110. The electronic lock 102 may be provided with a speaker configured to replay the audio memos/files for a person having the proper credentials such as, for example, via the same mobile device 104 used to create the audio memo/file or via a different mobile device 104. A speech-to-text feature could also be incorporated into the electronic lock system 100 to create other types of memos/files such as, for example, grocery lists, to-do lists, and the like, with such memos/files stored in a memory of the electronic lock 102 for subsequent retrieval (e.g., such as before heading out the door or for leaving a reminder when coming home). For example, a parent could leave a to-do list or other instructions/requests for a child when they come home from school. Thus, when a particular person leaves or comes home, the mobile device 104 of that person would receive a message including the list and/or reminders.

Figure 2:
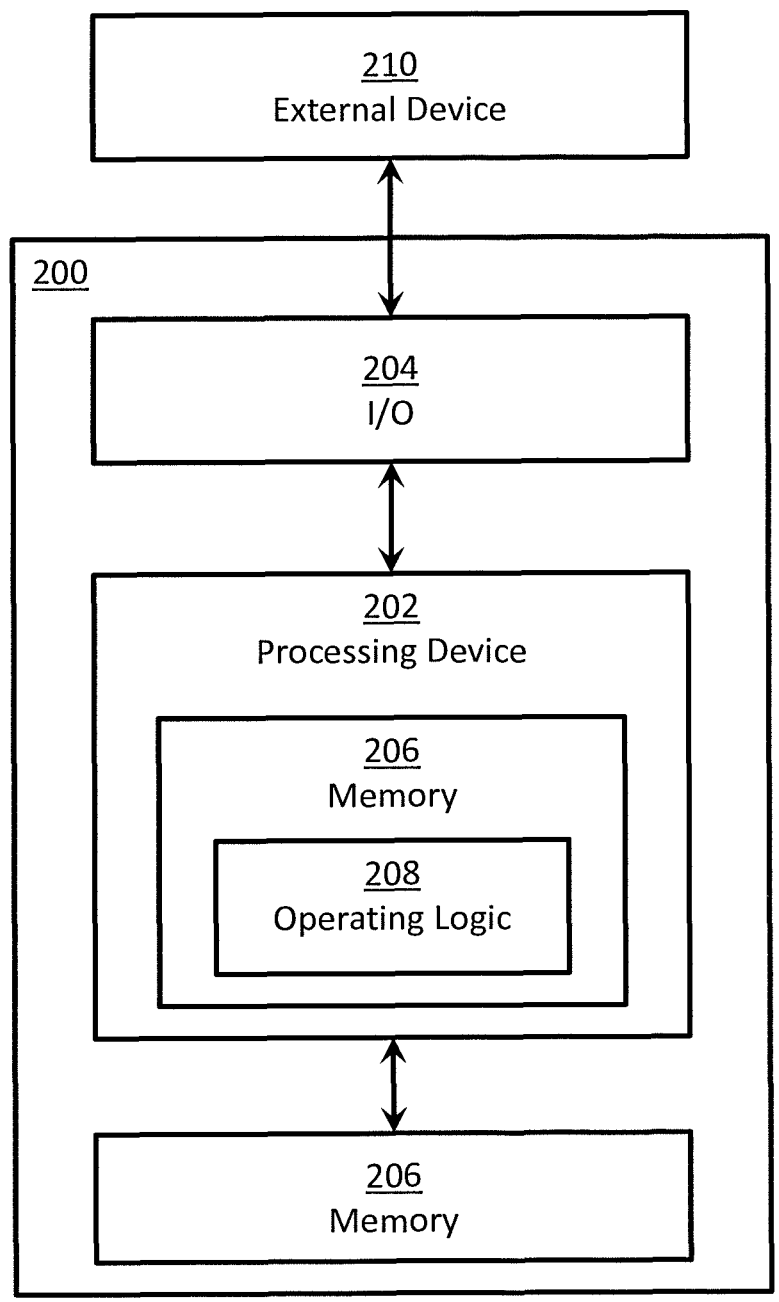
FIG. 2 is a schematic diagram of a computing device according to one embodiment for use in association with the electronic lock system of FIG. 1.

Referring to FIG. 2, illustrated therein is a schematic block diagram of one embodiment of a computing device 200 that may be used in association with the electronic lock system 100. The computing device 200 is one example of a device that may be used in association with the electronic lock 102, the mobile device 104, and/or the wireless device 108 shown in FIG. 1. In the illustrated embodiment, the computing device 200 includes a processing device 202, an input/output device 204, memory 206, and operating logic 208. Additionally, the computing device 200 may communicate with one or more external devices 210.

The input/output device 204 is configured to allow the computing device 200 to communicate with the external device 210. For example, the input/output device 204 may comprise a transceiver having Bluetooth or BLE capabilities, a network adapter, a network card, an interface, or one or more communication ports (e.g., USB port, serial port, parallel port, analog port, digital port, VGA, DVI, HDMI, FireWire, CAT 5 or any other type of communication port or interface). The input/output device 204 may include hardware, software, and/or firmware. It is also contemplated that the input/output device 204 may include more than one adapters, cards, or communication ports.

The external device 210 may be any type of device that allows data to be inputted to or outputted from the computing device 200. For example, the external device 210 may constitute a lock, a wireless device, a mobile device, a reader device, electronic equipment, a handheld computer, a diagnostic tool, a controller, a computer, a server, a processing system, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device 210 in communication with the computing device 200.

Processing device 202 can be a programmable-type, a dedicated hardwired state machine, or any combination of thereof. The processing device 202 may further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing. Processing device 202 may be dedicated to performance of just the operations described herein, or may be utilized in one or more additional applications. In one embodiment, the processing device 202 is of a programmable variety that executes algorithms and processes data in accordance with operating logic 208, as defined by programming instructions (such as software or firmware) stored in memory 206. Alternatively or additionally, operating logic 208 for processing device 202 is at least partially defined by hardwired logic or other hardware. Processing device 202 may include one or more components of any type suitable to process the signals received from input/output device 204 or elsewhere, and to provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. Additionally, memory 206 can store data/information that is manipulated by the operating logic 208 of processing device 202, such as data/information representative of signals received from and/or sent to the input/output device 204 in addition to or in lieu of storing programming instructions defining operating logic 208, just to name one example. As shown in FIG. 2, memory 206 may be included with processing device 202 and/or coupled to the processing device 202.

Figure 3:
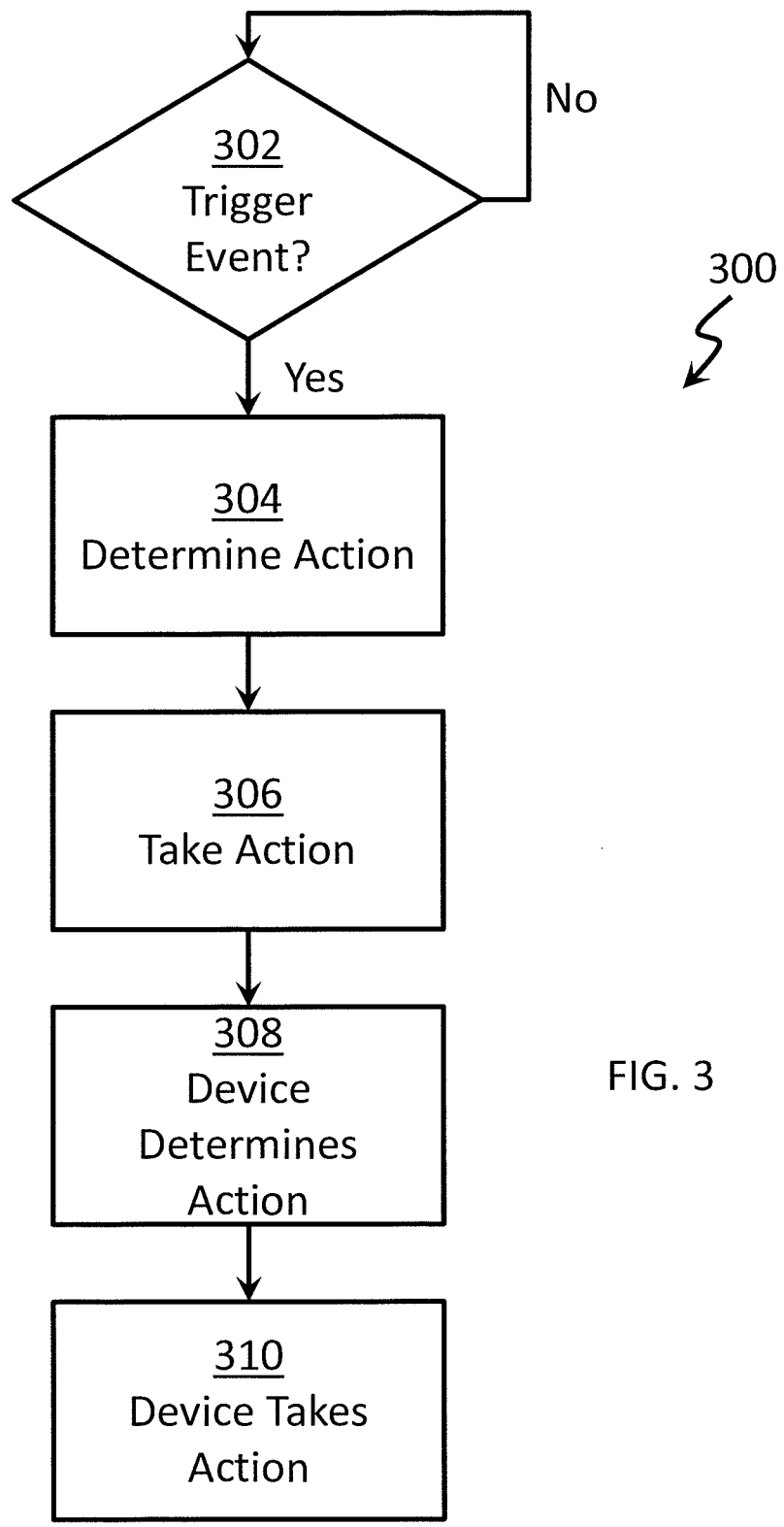
FIG. 3 is a schematic flow diagram of a process for operating an electronic lock according to one embodiment for use in association with the electronic lock system of FIG. 1.

Referring to FIG. 3, illustrated therein is a schematic flow diagram of an exemplary process 300 for an electronic lock 102 that is configured to communicate with a mobile device 104 and/or a wireless device 108. Operations illustrated for all of the processes in the present application are understood to be examples only, and operations may be combined/divided and/or added/removed, as well as re-ordered in whole or in part, unless explicitly stated to the contrary.

Process 300 begins with an operation/step 302. At operation/step 302, the electronic lock 102 determines whether or not a triggering event has occurred. A triggering event may include any number of the following scenarios as well as others not specifically listed herein: pressing a button; activating an input device; ringing a doorbell; turning a door handle or knob; opening a door; closing a door; unlocking a door; locking a door; tampering with an electronic lock; kicking in a door; and/or sensing when an electronic device (e.g., a mobile device 104) comes into communication range with the electronic lock 102. In some embodiments, the electronic lock 102 may be fitted with an accelerometer or a similar sensing device that is capable of detecting shock events from as little as knocking on the door to kicking in the door. If no triggering event has occurred, the electronic lock 102 may be configured to continuously monitor for a triggering event or periodically monitor for a triggering event.

Process 300 then proceeds from operation/step 302 to operation/step 304. At operation/step 304, the electronic lock 102 determines an action to take based upon or in response to the triggering event. The electronic lock 102 performs an action which may include, for example, sending a Bluetooth or BLE message 110 to the mobile device 104 and/or a wireless device 108 which may include initially determining which external device (e.g., mobile device 104 and/or wireless device 108) the message 110 is to be sent based on the detected triggering event.

Process 300 then proceeds from operation/step 304 to operation/step 306. At operation/step 306, the electronic lock 102 performs the appropriate action such as, for example, sending a Bluetooth or BLE message 110 to the mobile device 104 and/or to the wireless device 108.

Process 300 then proceeds from operation/step 306 to operation/step 308. At operation/step 308, the mobile device 104 and/or the wireless device 108 receives the Bluetooth or BLE message 110 and determines what action to take, if any, based on the message transmitted from the electronic lock 102.

Process 300 then proceeds from operation/step 308 to operation/step 310. At operation/step 310, the mobile device 104 and/or the wireless device 108 performs the action determined at operation/step 308. The action taken by the mobile device 104 and/or the wireless device 108 may be to ignore the message, call an emergency number, send or forward the message to another device, send a Bluetooth or BLE message 110 to the electronic lock 102 to perform another action of function such as, for example, to lock or unlock the electronic lock 102 and/or to trigger or sound an alarm.

The user may customize the action(s) to be taken for any given triggering event. In addition, the user may determine which mobile devices 104 and/or wireless devices 108 will receive a Bluetooth or BLE message 110 from the electronic lock 102 for any given action and/or triggering event. For example, a triggering event may include someone pressing a button on or near the electronic lock 102, such as pressing a door bell. In such a situation, the electronic lock 102 may send a Bluetooth or BLE message 110 only to the external devices 210 that are within Bluetooth communication range of the electronic lock 102, and ignore those external devices 210 that are out of Bluetooth communication range. This may include a variety of external devices 210, such as a mobile device 104 of any occupant within the building, which would alert the occupant to the presence of someone at the door 106. Those mobile devices 104 out of communication range may likely be carried by someone not in the building and therefore incapable of answering the door. If the only external device 210 within range is a computer and/or a network bridge, then such a triggering event may be logged in a database by the computer and/or network bridge which may be subsequently retrieved by the end user of the electronic lock system 100. In addition, the computer and/or network bridge may communicate the message (or the message contents) to a computer connected to the Internet which may utilize a relevant service such as a texting service, cloud home intelligence service, or any other communication-based service.

However, even if there are no mobile devices 104 within communication range, the end user may still be able to customize the electronic lock 102 to send a message to one, all, or any number of the mobile devices 104 associated with the electronic lock 102. For example, the external device 210 (e.g., a wireless device 108 such as a computer) that receives this message from the electronic lock 102 may also determine an action to be taken, which may include acknowledging the notification, ignoring the notification, or unlock the door. Furthermore, the wireless device 108 that receives such a message from the electronic lock 102 may send a message to one or more of the mobile devices 104 via an Internet connection. Additionally, if there are no mobile devices 104 or other wireless devices 108 in range, the lock is capable of storing the event or message until a mobile device 104 or wireless device 108 comes within range.

If someone tries to break in or kick in the door, the electronic lock 102 may send a message to some or all of the mobile devices 104 and/or the wireless devices 108 associated with the electronic lock system 100. This may include sending a Bluetooth or BLE message to all external devices 210 associated with the electronic lock 102 that are within Bluetooth communication range and/or sending a message to a computer or network bridge that is within Bluetooth communication range of the electronic lock 102, and through an application or executable software or firmware program on the computer or network bridge, send a message to all external devices outside of the Bluetooth communication range associated with the electronic lock 102 via the Internet (e.g., using an Internet service) or via a cellular network (e.g., using an SMS message). In such a situation indicative of a break-in, the electronic lock 102 may send an alarm message to some or all of the mobile devices 104 and/or wireless devices 108 associated with the electronic lock 102. The electronic lock 102 may also send a message to a third-party security company that may in turn notify the appropriate emergency responders or other personnel. The mobile devices 104 and/or wireless devices 108 that receive the message of a kicked in door may also determine an action to be taken, which may include calling an emergency number or canceling the call by the third-party security company if it is determined to be a false alarm.

Another example of a triggering event may include determining if/when a specific mobile device 104 comes within Bluetooth communication range of the electronic lock 102. In such a scenario, a person may take one or more of the following actions: create/send a text or audio message with an external device 210 (e.g., a mobile device 104 or a computer 108); store the message in the electronic lock 102, the mobile device 104, the wireless device 108, and/or on a cloud drive; and/or determine the triggering event for replaying the message such as transmitting that message to the target external device when it comes within Bluetooth communication range of the electronic lock 102. One example may include a parent leaving an audio message for a child to hear when they come home from school. When the child unlocks the electronic lock 102, the electronic lock 102 may play the audio message/file or the electronic lock 102 may cause the mobile device 104 and/or the wireless device 108 to play the message/file. The action taken by the external device 210 that receives the message may be to dismiss/ignore the message or to send/forward a message to whatever device 102, 104 or 106 that sent the original message to acknowledge receipt of the message.

Another example of a triggering event may include determining when a specific device is within Bluetooth communication range when the electronic lock 102 is in a locked state. In such a scenario, a person may create a text and/or audio message via an external device 210, such as a mobile device 104 or computer 106. The text and/or audio message may be stored in a database by the electronic lock 102, a mobile device 104, a wireless device 108, and/or in a cloud drive. The electronic lock 102, the mobile device 104, and/or the wireless device 108 may be configured to take an appropriate action in response to a triggering event which may be individually determined by the user. For example, the determined action may be to transmit the text and/or audio message from the mobile device 104 and/or wireless device 108 to the same external device 210 that created the message when the electronic lock 102 is locked and when that device is within Bluetooth communication range of the electronic lock 102. A person may leave a reminder message for themself upon leaving the house. When the person unlocks the electronic lock 102, a Bluetooth or BLE message may be sent to the mobile device 104. The Bluetooth message may include the audio message, or the audio message may be stored on the mobile device 104 in which the Bluetooth message identifies the audio message to be played. It is contemplated that the electronic lock 102 may store and play the audio message.

In other embodiments, the electronic lock 102 may be configured with alarms, text messages, emergency phone calls, and the like by the end user or with default settings. A doorbell may be connected to the electronic lock 102 that could be configured to send a message wirelessly to an external device 210. The electronic lock 102 may also be capable of triggering another wireless Bluetooth or BLE device such as, for example, a wireless door chime that could be triggered by a button near or on the electronic lock 102.

The various aspects of the process 300 illustrated and described above may be implemented in operating logic 208 as operations by software, hardware, artificial intelligence, fuzzy logic, or any combination thereof, or at least partially performed manually by a user or operator. In certain embodiments, operations represent software elements such as a computer program encoded on a computer readable medium, wherein the electronic lock 102 and/or the external device 210 perform the described operations when executing the computer program.

One aspect of the present application may include a method, comprising: determining via an electronic lock whether a triggering event has occurred; generating a message based on the triggering event; identifying a mobile device to receive the message based on the triggering event; and transmitting the message from the electronic lock to the mobile device via wireless communication.

Features of the aspect of the present application may include: the wireless communication is Bluetooth communication; the message includes at least one of an audio message, an alarm message, and a notification message; the triggering event includes at least one of unlocking a door, locking a door, moving a door, moving a door handle, opening a door, closing a door, pressing a button near the electronic lock, pressing a button on the electronic lock, and sensing an alarm condition; the method further comprises taking a responsive action using the mobile device; the method further comprises transmitting the responsive action to the electronic lock.

Another aspect of the present application may include a method, comprising: determining via an electronic lock whether a triggering event has occurred; generating a message based on the triggering event; identifying a wireless device to receive the message; transmitting the message from the electronic lock to the wireless device via wireless communication; and performing an action with the wireless device based on the message.

Features of the aspect of the present application may include: the wireless communication is Bluetooth communication; the message includes at least one of an audio message, an alarm message, and a notification message; the triggering event includes at least one of unlocking a door, locking a door, moving a door, moving a door handle, opening a door, closing a door, pressing a button near the electronic lock, pressing a button on the electronic lock, and sensing an alarm condition; the wireless device comprises at least one of a doorbell, a door chime, a computer, a bridge, a router, and a mobile device; the identifying a wireless device to receive the message is based on the triggering event; the performing the action includes at least one of logging the triggering event in a database, transmitting the message to a third party, and transmitting the message to a mobile device; the method further comprises identifying a mobile device to receive the message based on the triggering event; and transmitting the message from the electronic lock to the mobile device via Bluetooth.

Yet another aspect of the present application may include a system comprising an electronic lock and a wireless device. The electronic lock is configured to: determine whether a triggering event has occurred; generate a message based on the triggering event; identify a wireless device to receive the message based on the triggering event; and transmit the message from the electronic lock to the wireless device via wireless communication. The wireless device is configured to: receive the message; process the message; and perform an action based on the message.

Features of the aspect of the present application may include: the wireless communication is Bluetooth communication; the wireless device is further configured to relay the message to a third party or to a mobile device; the wireless device is a door chime, a computer, or a mobile device; the message includes at least one of an audio message, an alarm message, and a notification message.

Another aspect of the present application may include an apparatus comprising: an electronic lock configured with non-transitory computer executable instructions to determine whether a triggering event has occurred, generate a Bluetooth message based on the triggering event, identify a wireless device to receive the Bluetooth message, and transmit the Bluetooth message to the wireless device via Bluetooth communication, wherein the Bluetooth message includes information about the triggering event.

While the invention has been illustrated and described in detail in the drawings and the foregoing description, the same is to be considered as illustrative and not restrictive in character, it being understood that only the preferred embodiments have been shown and described, and that all changes and modifications that come within the spirit of the inventions are desired to be protected.

It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used item can include a portion and/or the entire item unless specifically stated to the contrary.

What is claimed is:

1. A method, comprising:
   storing a first message in an electronic lock, wherein the first message is created on a first mobile device and transmitted to the electronic lock for storage;
   determining via the electronic lock a first type of triggering event that has occurred and determining via the electronic lock a second type of triggering event that has occurred, wherein the first type of triggering event is distinguished from the second type of triggering event, and the first type of triggering event includes identifying the first mobile device being in a first communication range of the electronic lock;
   generating a second message based on the second type of triggering event;
   identifying, with the electronic lock, a plurality of external devices in a second communication range that is outside the first communication range to receive the second message in response to the second type of triggering event; and
   transmitting the first message from the electronic lock to the first mobile device in the first communication range via wireless communication in response to the first mobile device unlocking the electronic lock and transmitting the second message from the electronic lock to the plurality of external devices in the second communication range via one of an Internet and a cellular network.

2. The method of claim 1, wherein the wireless communication is Bluetooth communication.

3. The method of claim 1, wherein the first message includes an audio message.

4. The method of claim 1, wherein the second type of triggering event includes at least one of unlocking a door, locking a door, moving a door, moving a door handle, opening a door, closing a door, pressing a button near the electronic lock, pressing a button on the electronic lock, and sensing an alarm condition.

5. The method of claim 1, further comprising taking a responsive action using the mobile device.

6. The method of claim 5, further comprising transmitting the responsive action to the electronic lock.

7. A method, comprising:
   creating a first message;
   storing the first message in an electronic lock;
   determining via the electronic lock a first type of triggering event that has occurred and a second type of triggering event that has occurred, wherein the first type of triggering event is distinguished from the second type of triggering event and the first type of triggering event includes unlocking the electronic lock with a specific mobile device;
   generating a second message based on the second type of triggering event;
   identifying, with the electronic lock, the specific mobile device from a plurality of external devices in a first communication range to receive the first message in response to the first type of triggering event and identifying, with the electronic lock, the plurality of external devices in a second communication range that is outside the first communication range to receive the second message in response to the second type of triggering event;
   transmitting the first message from the electronic lock to the specific mobile device in the first communication range via wireless communication in response to the specific mobile device unlocking the electronic lock and transmitting the second message from the electronic lock to the plurality of external devices in the second communication range via one of an Internet and a cellular network; and
   performing an action with the specific mobile device based on the first message.

8. The method of claim 7, wherein the wireless communication is Bluetooth communication.

9. The method of claim 7, wherein the first message includes a text message.

10. The method of claim 7, wherein the second type of triggering event includes at least one of unlocking a door, locking a door, moving a door, moving a door handle, opening a door, closing a door, pressing a button near the electronic lock, pressing a button on the electronic lock, and sensing an alarm condition.

11. The method of claim 7, wherein the wireless device comprises at least one of a computer and a mobile device.

12. The method of claim 7, wherein the performing the action includes at least one of logging the first type of triggering event in a database, transmitting the first message to a third party, and transmitting the first message to a second mobile device.

13. The method of claim 7, wherein the first message is an audio message.

14. A system, comprising:
   an electronic lock configured to:
      store a first message;
      determine a type of triggering event has occurred;
      generate a second message based on the type of triggering event;
      identify a specific wireless device from a plurality of external devices in a first communication range to receive the first message based on a first type of triggering event, wherein the first type is triggering event includes the specific wireless device unlocking the electronic lock, and identify the one or more of the external devices outside the first communication range to receive the second message based on a second type of triggering event; and transmit the first message from the electronic lock to the specific wireless device via wireless communication in response to the first type of triggering event and transmit the second message to the one or more external devices outside the first communication range in response to the second type of triggering event via one of an Internet and a cellular network; and wherein the specific wireless device is configured to:
receive the first message;
process the first message; and
perform an action based on the first message.

15. The system of claim 14, wherein the wireless communication is Bluetooth communication.

16. The system of claim 14, wherein the specific wireless device is further configured to relay the first message to a third party or to a mobile device.

17. The system of claim 14, wherein the specific wireless device is a computer; or a mobile device.

18. The system of claim 14, wherein the first message includes an audio message.

* * * * *